United States Patent Office 3,047,493
Patented July 31, 1962

3,047,493
DRILLING PROCESS AND WATER BASE
DRILLING MUDS
Milton Rosenberg, Pittsburgh, Pa., assignor to Gulf Research & Development Company, Pittsburgh, Pa., a corporation of Delaware
No Drawing. Filed May 26, 1958, Ser. No. 737,494
24 Claims. (Cl. 252—8.5)

This invention relates to the drilling of wells and more particularly to the drilling of wells with water base drilling muds that provide effective lubrication of the drill bit and drill pipe.

In the drilling of wells with rotary drilling equipment, a liquid generally referred to as a drilling mud is circulated down the hole to the bit and back up the hole to the surface. The drilling mud applies a hydrostatic pressure against the formations penetrated by the bit to prevent fluids under high pressures in the formations penetrated entering the borehole. Among other important functions of the drilling mud are cooling the bit and carrying cuttings made by the bit from the borehole.

Because of the different functions of the drilling mud, several of which are conflicting, the preparation of a drilling mud for use in drilling a well ordinarily demands some compromise. For example, the drilling mud must have a high enough density to prevent entrance of formation fluids into the borehole of the well, but if the density is too high, the hydrostatic pressure developed by the column of drilling mud may fracture a formation penetrated by the well and cause loss of circulation of drilling mud. Similarly, a drilling mud is preferably thixotropic and has a viscosity and gel strength high enough to carry cuttings and weighting materials from the borehole of the well. However, if the viscosity and gel strength are too high, they interfere with the separation of cuttings at the well head and, in the event that gas should enter the borehole, the separation of gas from the drilling mud. High viscosities and gel strengths also interfere with the running of pipe into and out of the hole.

It is important in the drilling of wells that the rate of loss of liquid through the borehole wall into the formation be low to prevent increasing the solids content of the drilling mud in the borehole. Loss of fluids into shales may cause hydration and heaving of shales which in turn may cause sticking of the drill pipe. In order to reduce the fluid loss from the drilling mud, bentonite or natural occurring clays are added to the mud. The presence of clays in the drilling mud may, however, cause excessive viscosities and gel strengths of the mud, particularly when the mud is contaminated with certain chemicals. Although there are frequent references to the lubricating properties of drilling muds, because of the many other properties of the drilling muds that must be controlled, little attention has been given to the preparation of drilling muds that are effective lubricants. Modification of drilling muds to provide muds having lubricating properties can be of value only if it does not seriously impair other properties of the drilling mud.

The drill bits used in rotary drilling usually have two or more cones rotatably mounted on pins at the lower end of the bit. A series of cutting elements or teeth extending from the outer surface of the cones engage the bottom of the hole and cause the cone to rotate about the pins as the drill pipe and drill bit are rotated. The cutting elements strike the bottom of the hole with a series of hammer-like blows to form cuttings which are carried to the surface by the drilling mud. In many instances, failure of drill bits is caused by failure of the bearings supporting the cones on the pins rather than wearing out of the cutting elements on the cones. When the bit fails it is necessary to pull the drill pipe from the hole to replace the bit and then run the bit to the bottom of the hole. The time required for the "round trip" in deep wells is a substantial part of the time required for drilling the hole and is an important part of the cost of drilling; hence, it is desirable to reduce the number of bit changes to a minimum. When a bit fails because of failure of the bearings, there is danger of leaving a cone in the hole which may necessitate a fishing job to remove the cone and thereby further increase the time the drilling rig is required.

In the drilling of wells, particularly deep wells and directional wells, friction between the drill pipe and the borehole wall may be sufficient to interfere with running pipe into and out of the hole. High friction between the drill pipe and the borehole wall also increases the torque and power required to rotate the drill pipe, the wear and stress on the drill pipe, and causes danger of twist offs of the drill pipe.

It has been found that measurements on the Timken Wear and Lubricant Tester of the load carrying capacity of drilling muds gives a good indication of the lubricating properties and effectiveness of the mud in increasing the life of bearings on drill bits. The load carrying capacity measured on the Timken machine (hereinafter referred to as the Timken load carrying capacity) has been correlated with tests on drill bits in laboratory equipment in which the drill bits are run to failure while drilling mud is circulated through the bit and also with field tests in the actual drilling of oil wells. Load carrying capacities above about 30 pounds as measured on the Timken machine are required for drilling muds to produce a significant increase in the life of drill bits. The load carrying capacities measured on the Timken machine of ordinary drilling muds are usually in the range of 10 pounds or less. The drilling muds prepared according to this invention have load carrying capacities ranging from about 30 pounds up to 100 pounds, the maximum measurement on the Timken machine. When other testing machines are used to measure the load carrying capacity of drilling muds, the lower limit of load carrying capacity, as measured by those machines, will correspond to a Timken load carrying capacity of 30 pounds.

This invention resides in a novel water base drilling mud having a Timken load carrying capacity above about 30 pounds and a rotary drilling process using the mud. The drilling mud contains a small amount, sufficient to give the mud a Timken load carrying capacity above about 30 pounds, of a carboxylic acid compound dispersed in the water. The carboxylic acid compounds which can be used to prepare the improved drilling muds are fatty acids having at least 8 carbon atoms per molecule, triglycerides of fatty acids, rosin acids, and dibasic acids. Such compounds are identified by the term "load carrying agents" in this specification. The term "water base drilling mud" refers to drilling muds in which there is no substantial oil phase other than the load carrying agent and does not include oil-in-water emulsions in which a hydrocarbon oil phase constitutes at least about 5% of the drilling mud. It has been found that the drilling muds of this invention cause a marked increase in life of bearings of rotary drill bits and a reduction of the friction between the drill pipe and the borehole wall.

The fatty acids useful to increase the lubricating properties of drilling muds are either saturated or unsaturated fatty acids having 8 to 20 carbon atoms per molecule. When saturated acids of high molecular weight and melting point are added to the drilling mud, it is desirable to melt the saturated fatty acids and mix the melted acid with clay to form a composition which is then added to the drilling mud. A preferred fatty acid for use in this invention is oleic acid. Other suitable fatty acids are linoleic, linolenic, ricinoleic, and stearic acids. Acids of low molecular weight which can be used are undecanoic and pelargonic acids.

Impure fatty acids, mixtures of more than one fatty acid, or mixtures of fatty acids with other materials such as rosin acids can be added to drilling muds to improve the load carrying capacity of the mud. For example, a preferred source of the fatty acids, because of its low price in comparison with single acids, is tall oil, a mixture of fatty acids and rosin acids. Tall oil pitch, which is obtained as a bottoms product in the distillation of tall oil, and which contains fatty acids and rosin acids as well as other high molecular weight compounds, can be used. The naturally occurring triglycerides of fatty acids such as linseed oil, caster oil, cottonseed oil, soya oil, tallow, etc., will also increase the load carrying capacity of the muds. Pitches separated as a bottoms product on the distillation of fatty acids obtained by splitting the triglycerides of fatty acids occurring in fatty oils are effective. The rosin acids suitable for use in this invention are the monocarboxylic acids of hydrophenanthrene in the resinous material obtained from the stumps of pine trees and from turpentine taken from living pine trees as well as the rosin acids derived from tall oil. Abietic acid, and the disproportionated acids resulting from heating abietic acid, are rosin acids which are effective load carrying agents.

The concentration of load carrying agent required in the mud to increase its load carrying capacity to a value at which the mud is effective in lubricating the bit is in the range of about 0.3 to about 7% by volume of the mud. Concentrations in the lower part of the range are effective in drilling muds having low densities as a result of low clay solids concentrations and low concentrations of weighting agents. Low density, low solids content drilling muds, for example, having densities below about 9 pounds per gallon, are frequently used in hard rock areas such as West Texas. Low concentrations of load carrying agent are also effective in muds having densities higher than about 9 pounds per gallon when the high density is caused by dissolved materials in the drilling mud. Such high density, low solids content muds are frequently prepared from saturated salt solutions. Whenever clay solids or weighting agents are incorporated in the mud to give a mud having a density exceeding about 9 pounds per gallon, concentrations of load carrying agent in the range exceeding about 1% and preferably between 1% and 3%, are used. There are indications that high concentrations of load carrying agent sometimes actually reduce the load carrying capacity of the drilling mud, but usually such reduction does not occur until the economic range of concentrations has been exceeded by a substantial margin. An illustration of the relationship between density of the drilling muds, concentration of the load carrying agent, and the load carrying capacity of drilling muds is presented in Table I for drilling muds containing 6% bentonite and sufficient barite to give a mud of the indicated density.

TABLE I

*Load Carrying Capacities of Weighted Bentonite-Barite Water Suspensions With Varying Concentrations of Refined Tall Oil* [1]

| Percent by vol. refined tall oil | Density of bentonite-barite water suspensions | | | |
|---|---|---|---|---|
| | 10 lb./gal. | 12.5 lb./gal. | 15 lb./gal. | 18 lb./gal. |
| | Timken load, lb. | | | |
| 0.5 | | | | |
| 1.0 | [2] 20 | [2] 5 | | |
| 2.0 | 100 | 5 | 5 | 20 |
| 3.0 | 100 | 35 | 15 | 100 |
| 4.0 | 100 | 100 | 100 | |
| 5.0 | 80 | 100 | 100 | 70 |
| | | 100 | 100 | |

[1] Refined Tall Oil, Indusoil M 28, West Virginia Pulp & Paper Co.
[2] Fail.

In addition to depending upon the concentration of suspended solids in the mud, the concentration of load carrying agent required will also depend upon the specific load carrying agent used and the emulsifying agent used to disperse the load carrying agent in the drilling mud. In general as the solids content of the mud is increased, the concentration of load carrying agent required increases as illustrated in Table I. Some of the emulsifiers used to form a dispersion of a load carrying agent in the drilling mud will permit smaller amounts of the load carrying agent to be used than are required when clay solids are used to disperse the load carrying agent. Sodium metaborate is particularly effective in forming dispersions of high load carrying capacity having low concentrations of load carrying agent.

To be effective in increasing the load carrying capacity of the drilling mud, the load carrying agent must be dispersed in the water base mud. Because the agents are generally insoluble in water, an emulsifier or dispersing agent is required to form a stable dispersion of the agent in water. A preferred and highly effective emulsifier is clay which in concentrations in the drilling mud in excess of about 0.25% by weight forms a stable dispersion of the load carrying agent in water. The maximum concentration of the clay is not limited by this invention and may range upward to as high as 20%, or even more, for native clays, in accordance with usual mud practices. When bentonite is used as an emulsifier, the maximum concentration is somewhat lower, in the range of about 8 to 10% by weight of the drilling mud. The clays may be of the montmorillonite, attapulgite, or kaolinite type. Synthetic clays such as the synthetic zeolites can also be used. Small amounts of diatomaceous earths also are effective in forming the desired dispersion of the load carrying agents in the water base drilling muds.

Frequently in drilling through hard rock formations in which shales are not present, a drilling mud which is substantially water is used. Such drilling muds may cause some difficulty in carrying cuttings from the hole but suffer none of the disadvantages such as gas cutting or difficulty in separating cuttings which may occur in muds of high viscosity, gel strength, and solids content. Such muds have very low concentrations of suspended solids. The incorporation of small amounts of clay, from about 0.25% up to about 2% by weight of the mud, and a load carrying agent in the drilling mud produces a drilling mud having substantially the density, viscosity, and gel strength of the water ordinarily used in drilling the hard formations plus a high load carrying capacity which results in greatly increased life of the bearings of the drill bits.

Emulsifiers other than clay can also be used to disperse the load carrying agent. Generally speaking, the only requirement of the emulsifier is the ability to disperse the load carrying agent. Emulsifiers which have been found to be effective in the preparation of the drilling muds of this invention are sodium carboxymethyl cellulose, the mined lignins, calcium lignosulfonate, quebracho, petroleum sulfonates, sodium carbolate, sulfonated castor oil, sodium alkyl aryl sulfonates, non-ionic surface active agents, such as sorbitan trioleate, condensation products of ethylene oxide and polypropylene glycol, polyoxyethylene sorbitan monooleate, etc. Very low concentrations, for example, less than about 0.25% by weight of most of these emulsifiers are effective in dispersing the load carrying agents in the mud. An especially effective emulsifier is sodium metaborate.

The load carrying capacity of the drilling muds of this invention can be further enhanced by the incorporation of small amounts of compounds of calcium, barium, strontium, and aluminum. Calcium compounds are particularly effective enhancers of the load carrying capacity. Both soluble calcium compounds, such as calcium chloride and calcium acetate, and insoluble compounds, such as calcium hydroxide and calcium carbonate, are effective. It is preferred to add the compounds enhancing the load carrying capacity of drilling muds in amounts in the range of about ¼ to ¾ pounds per barrel of drilling mud. Calcium compounds have been used satisfactorily in concentrations as high as 4 pounds per barrel. High concentrations of calcium cause separation of grease which interferes with use of the drilling muds. In some instances greasing out of the load carrying agent can be overcome by the addition of additional amounts of an emulsifier such as Igepal CO, a condensation product of alkyl substituted phenols and ethylene oxide, marketed by General Aniline & Film Corporation.

Constituents other than the essential load carrying agent and emulsifier for dispersion of the load carrying agent can be added to the water base drilling mud to give the mud other properties required to meet the conditions expected or encountered in the drilling of a well. Muds of high load carrying capacity can be prepared using saturated brine or sea water in place of fresh water. Characteristics of the mud, for example, the density, viscosity, gel strength, and water loss are adjusted by conventional techniques. For example, if gas cutting of the mud should occur, the density of the mud can be increased and/or the gel strength and viscosity of the mud reduced and mechanical degasing equipment employed in the usual manner to prevent gas cutting. As discussed above, if weighting agents are added to increase the density of the mud, it may be necessary to increase the concentration of the load carrying agent to maintain the desired load carrying capacity of the mud. Thus, the load carrying agents are added to muds wholly satisfactory in other respects to increase the load carrying capacity of such muds and thereby increase the bearing life of the drill bits.

The drilling muds of high load carrying capacity are preferably prepared by adding the load carrying agent directly to the drilling mud in the mixing hopper. The load carrying agent also can be mixed with clays or other emulsifier or suspending agent and the mixture added in the usual manner for incorporating additives in drilling muds.

To illustrate the effect of the addition of different load carrying agents to water base drilling muds, a number of drilling muds were prepared by the addition of several load carrying agents in different water base muds and the load carrying capacity of the resultant mud measured on the Timken machine. The muds were prepared by merely adding the load carrying agent and emulsifier to water in a propeller type mixer. The compositions of the mud and the load carrying capacity are set forth in the following Table II.

TABLE II

*Load Carrying Capacities of Mineral Solids-Water Suspensions Containing Carboxylic Acids*

| Sample No. | Percent by volume load carrying agent | Amount and type of clay solids in suspension | Timkne load, lbs. |
|---|---|---|---|
| 1 | | 6% by weight bentonite | a 5 |
| 2 | 0.6 oleic acid | do | 80 |
| 3 | 0.6 oleic acid plus 2 lb./bbl. quebracho | do | 100 |
| 4 | 1.2 oleic acid | 12.5% by weight X-act. clay [1] | 100 |
| 5 | 0.6 linoleic acid | 6% by weight bentonite | 100 |
| 6 | 0.9 ricinoleic acid | do | 100 |
| 7 | 1.0 dibasic acid [2] | do | 100 |
| 8 | 9 lb./bbl. abietic acid crystals (dissolved in 300 cc. benzol) | do | 60 |
| 9 | 0.6 undecanoic acid | do | 100 |
| 10 | 0.6 pelargonic acid | do | 55 |
| 11 | 0.5 crude tall oil [3] | 6% bentonite-water | 100 |
| 12 | 0.9 linseed oil [4] | do | 100 |
| 13 | 1.0 castor oil—Blown [5] | do | 100 |
| 14 | 1.0 castor oil—Pitch [6] | do | 100 |
| 15 | 1.0 linseed oil [7] | do | 85 |
| 16 | 1.0 castor oil—Pitch [8] | do | 50 |
| 17 | 1.0 crude tall oil [9] | Lime base fluid [10] | 25 |
| 18 | | 6% by weight Aquagel [11] | a 5 |
| 19 | 0.1 oleic acid | 6% Aquagel | a 5 |
| 20 | 0.2 oleic acid | do | 20 |
| 21 | 0.5 oleic acid | .8% Aquagel | 25 |
| 22 | 1.0 oleic acid | .4% Aquagel | 35 |
| 23 | 1.0 Liqro,[12] (heated to 100° F.) | 1.5% by weight Zeogel,[13] .9% by weight Aquagel | 100 |
| 24 | 1.0 Liqro | 1.5% Zeogel | 100 |
| 25 | 0.5 Liqro | do | 80 |
| 26 | 1.0 oleic acid | 2 lb./bbl. kaolinite | 90 |
| 27 | 0.5 oleic acid | 2 lb./bbl. diatomaceous earth | 50 | a Fail.
[1] Non-swelling type clay.
[2] Dibasic acid, Empol 1022, Emery Industries, Inc.: Acid value, 180 min.; saponification value, 185 min.; unsaponifiable, 2.0% max.
[3] Crude tall oil "Liqro," West Virginia Pulp & Paper Co.: Acid number 155–170; saponification number 165–180; rosin acids number, 65–86, fatty acids, 46–58; rosin acids, 35–46; sterols, higher alcohols, etc., percent, 6–10.
[4] Linseed oil (degummed Vegblend oil, National Lead Co.): Neutralization value, 9.3; saponification number, 199.
[5] Castor oil—Blown, pale 170 oil, Baker Castor Oil Co.: Acid value, 5; iodine value, 86; saponification value, 180.
[6] Castor oil—Pitch R-7, Baker Castor Oil Co.: Neutralization value, 54; saponification number 218.
[7] Linseed oil (degummed Vegblend oil), National Lead Co.: Neutralization value, 9.3; saponification number, 199.
[8] Castor oil—Pitch (R-RHA), Baker Castor Oil Co.: Neutralization value, 143; saponification number 217.
[9] Crude tall oil specialty 57201, West Virginia Pulp & Paper Co.: Acid number, 130–160; saponification number, 132–162; rosin acids, percent, saturated acids, percent, and unsaponifiables, percent, 22–42; fatty acids, percent, 58–78.
[10] Lime base fluid, 3 lb./bbl.; calcium hydroxide, 2 lb./bbl.; calcium lignosulfonate (Kembreak), and 21 lb./bbl. bentonite in water.
[11] Aquagel—Bentonitic-type clay mineral.
[12] Liqro—Crude tall oil, West Virginia Pulp & Paper Co.
[13] Zeogel—Attapulgite-type clay mineral.

NOTE.—Except for the Timken loads marked "Fail" all of the Timken loads in Table II are the maximum loads at which there was no seizure.

Examples of the use of materials other than clay type solids for dispersing the load carrying agent in water to prepare fluids of increased load carrying capacity are illustrated in Table III.

TABLE III

*Load Carrying Capacities of Mineral Solids-Water Suspensions Containing Carboxylic Acids*

| Sample No. | Percent by volume load carrying agent | Amount and type of dispersant | Timken load, lbs. |
|---|---|---|---|
| 28 | 1.0 oleic acid | .25% Pluronic L 31 [1] | 100 |
| 29 | do | 1 lb./bbl. sodium carbolate | 100 |
| 30 | do | ½ lb./bbl. Petronate DML [2] | 45 |
| 31 | 1.0 Liqro | .25% sulfonated castor oil | 50 |
| 32 | 1.0 oleic acid | 1 lb./bbl. sodium metasilicate | 100 |
| 33 | 1.0 by weight Liqro | .25% by vol. Ultramet L 60 [3] | 70 |
| 34 | do | .12 by vol. Tween 85 [4] | 60 |
| 35 | do | .25 by vol. Tween 80 [4] | 100 |
| 36 | 1.0 oleic acid | 3 lb./bbl. Carbonox [5] | 35 |
| 37 | do | 3 lb./bbl. Kembreak [6] | 55 |
| 38 | do | 3 lb./bbl. quebracho | 50 |
| 39 | 0.5 oleic acid | ½ lb./bbl. sodium metaborate | 80 |
| 40 | do | 2 lb./bbl. CMC [7] | 100 |
| 41 | 1.0 oleic acid | 3 lb./bbl. Tannex [8] | 90 |

[1] Condensation products of ethylene oxide and polypropylene glycol—Wyandotte Chemical Company.
[2] Sodium petroleum sulfonate.
[3] Sodium alkyl benzene sulfonate—Atlantic Refining Co.
[4] Tris-polyoxyethylene sorbitan monooleate—Atlas Powder Company.
[5] Mined lignin—National Lead Company.
[6] Calcium lignosulfonate—Marathon Corporation.
[7] Sodium carboxymethyl cellulose—Hercules Powder Co.
[8] Quebracho extract—National Lead Company.

In the use of the drilling muds of this invention, conventional rotary drilling techniques are employed. In the most common practice, the drilling mud is pumped down through the drill pipe and discharged from the bit against the bottom of the hole. The drilling mud picks up the cuttings and carries them through the annular space surrounding the drill pipe to the equipment at the well head for separating cuttings from the drilling mud. The borehole is filled with the drilling mud; hence, the drill bits operate submerged in the drilling mud which comes in contact with the bearings. If desired, reverse circulation of the drilling mud down the annulus and up through the drill pipe can be employed.

In order to test the drilling muds of this invention, a well was drilled in a West Texas field in which 40 wells have been drilled in the last six years. The structure of the field is a gently dipping anticline in which the sediments are homogeneous enough in character that drilling conditions have been found to be uniform from location to location. The normal procedure in drilling wells in this area is to use water as a drilling mud for the interval from 4,150 feet to 8,450 feet. To show the effect of the load carrying agent, two bit runs were conducted with water to which oleic acid had been added in the concentration of about 1% by volume. Six and one-half pounds of clay per barrel were added to the water to disperse the oleic acid. During the intervals during which drilling was with water treated with oleic acid, the drilling mud was sampled, its load carrying capacity determined by use of the Timken wear and lubricant testing machine, and oleic acid was added to the mud system to maintain the desired load carrying capacity. Data for the drilling of the well are presented in Table IV.

TABLE IV

| Bit No. | Footage drilled | Drilling fluid | Remarks |
|---|---|---|---|
| 12 | 270 | Water | Procedures normal. |
| 13 | 1,198 | Trtd. water | |
| 14 | 476 | Water | Some residual EP agent still present in system. |
| 15 | 312 | do | Procedures normal. |
| 16 | 915 | Trtd. water | |
| 17 | 247 | Water | Some residual EP agent still present in system. |
| 18 | 58 | do | Procedures normal. |
| 19 | 50 | do | Do. |
| 20 | 141 | do | Do. |

Bit No. 13 was a Reed YC-J 8¾ inch chert bit which had tungsten carbide inserts. The largest footage drilled with a Reed YC-J chert bit at other wells in the field was 504 feet. The highest footage drilled at other wells with bits of the same type as bits Nos. 12 and 14 through 20 in the same field was 344 feet.

The effect of the residual load carrying agent in the system on bit No. 14 is indicated by the fact that to drill similar sections in the same field at other wells it has been necessary to use from 1½ to 2¾ bits. The addition of the oleic acid to the drilling mud resulted in a drop from 16.5 to 9.0 on the scale of the torque recorder.

Another test was performed in West Texas in a field in which the normal procedure is to set an intermediate string of casing at about 4,300 feet and use a drill of 8¾ inch diameter and water as a drilling fluid from 4,300 feet to a total depth of 11,800 feet. The interval from about 5,200 feet to about 7,400 feet was drilled using fresh water to which tall oil had been added in quantities to give a concentration of about 1% by volume. Five pounds of clay per barrel of mud were added to the drilling mud to disperse the tall oil. The total footage was drilled with chert bits. A comparison of drilling with the fresh water and water treated with tall oil is presented in Table V.

TABLE V

*Total Footage and Hours Drilled With 8¾ Inch Chert Bits in Lubricating and Non-Lubricating Type Fluids*

| Bit No. | Fluid used | Footage drilled |
|---|---|---|
| 24 | Fresh water | 364 |
| 25 | Treated fresh water | 678 |
| 27 | do | 801 |
| 28 | Fresh water | 374 |

A comparison of the bits used during the drilling of the interval from about 5,000 to 9,000 feet in a test well with the bits used in drilling nearby wells in the same field which are typical of normal practice in the field is presented in the following Table VI.

TABLE VI

*Comparison of Number of Bits Used in Test Well and Adjacent Wells at Similar Depths*

| | Test Well | Well A | Well B |
|---|---|---|---|
| Interval | 5,194-8,910 | 5,170-9,000 | 5,098-8,941 |
| Chert bits | 6 | 13 | 12 |
| Regular bits | 1 | 1 | 3 |

The drilling mud in the test well was "mudded up" by increasing the clay concentration to about 25 pounds per barrel. Additional tall oil was added to the mud to increase the tall oil concentration to about 1½%. The drilling was then continued to a total depth of 10,310 feet. The bits used in the drilling of a test well compared with bits used in Well A and Well B in a similar interval in Table VII.

TABLE VII

*Comparison of Number of Bits Used in Test Well Using Treated Mud and Adjacent Wells Using Untreated Mud*

| | Test Well | Well A | Well B |
|---|---|---|---|
| Interval | 8,910-10,310 | 9,000-10,321 | 8,941-10,373 |
| Chert bits | 2.3 | 7 | 8 |
| Regular bits | 8 | 9 | 15 |

The test was discontinued at a depth of 10,310 feet because of crooked hole trouble. The chert bit used prior to the crooked hole trouble had drilled 431 feet which is more than three times the footage made on the longest bit runs in the same section of the comparison wells. Addition of the tall oil to the drilling mud resulted in a reduction of the torque rotating off bottom at 5,297 feet from 1600 foot pounds to 1200 foot pounds and rotating on bottom from 3000 foot pounds to 1450 foot pounds.

The improved drilling muds of this invention greatly increase the life of bearings of rotary drill bits and thereby reduce the number of bit changes required during the drilling of a well. Savings from the use of this invention are largest when drilling where bearing failure is the principal cause of bit failure, such as for example, in areas where bits with tungsten carbide inserts are used. The reduction in the number of bits required is also particularly important in deep wells because of the increased time required for round trips to change bits. The sharp reduction in torque required to rotate the drill pipe results in reduced wear on the drill pipe and other rig equipment. Reduced stress and wear of the equipment is also encountered when these novel drilling muds are used in turbine drills.

I claim:

1. A water base drilling mud of high load carrying capacity consisting essentially of water, an organic carboxylic compound selected from the group consisting of monobasic carboxylic acids having 8 to 20 carbon atoms per molecule, triglycerides of fatty acids having 12 to 18 carbon atoms per molecule and rosin acids and an emulsifier effective in dispersing the organic carboxylic compound in the water, the concentration of the organic carboxylic compound in the mud being between about 0.3% and 7% and sufficient to impart a Timken load carrying capacity of at least 30 pounds.

2. A drilling mud as set forth in claim 1 in which the organic carboxylic compound is oleic acid.

3. A drilling mud as set forth in claim 1 in which the organic carboxylic compound is tall oil.

4. A drilling mud as set forth in claim 1 in which the organic carboxylic compound is a fatty acid having 8 to 20 carbon atoms per molecule.

5. A drilling mud as set forth in claim 1 in which the organic carboxylic compound is a rosin acid.

6. A drilling mud as set forth in claim 1 in which the organic carboxylic compound is a triglyceride of a fatty acid having 12 to 18 carbon atoms per molecule.

7. A water base drilling mud consisting essentially of water, clay in a concentration by weight between about 0.25% and 20% of the drilling mud, and a compound selected from the group consisting of monobasic fatty acids having 8 to 20 carbon atoms per molecule, triglycerides of fatty acids having 12 to 18 carbon atoms per molecule and rosin acids dispersed in the drilling mud in a concentration between about 0.3% and 7% by volume of the drilling mud effective to form a drilling mud having a Timken load carrying capacity of at least about 30 pounds.

8. A water base drilling mud consisting essentially of water, clay in an amount between about 0.25% and about 2% by weight of the drilling mud, and a compound selected from the group consisting of monobasic fatty acids having 8 to 20 carbon atoms per molecule, triglycerides of fatty acids having 12 to 18 carbon atoms per molecule and rosin acids in concentrations of about 0.3% to about 7% by volume of the mud effective to form a mud having a Timken load carrying capacity of at least about 30 pounds.

9. A water base drilling mud having a density exceeding 9 pounds per gallon consisting essentially of water, clay dispersed in the water in a concentration between about 0.25% and 20% by weight of the drilling mud, and a monobasic fatty acid containing 8 to 20 carbon atoms per molecule, the fatty acid being present in concentrations of 1% to about 7% by volume effective to increase the Timken load carrying capacity of the mud to above about 30 pounds.

10. A water base drilling mud having a density exceeding 9 pounds per gallon consisting essentially of water, clay in an amount equal to about 2 to 20% by weight of the drilling mud, a weighting agent and a monobasic fatty acid having 8 to 20 carbon atoms per molecule, the concentration of the fatty acid being about 1% to about 7% by volume of the drilling mud and sufficient to give the mud a Timken load carrying capacity of at least 30 pounds.

11. A water base drilling mud having a density below about 9 pounds per gallon consisting essentially of water, a carboxylic acid compound selected from the group consisting of monobasic fatty acids having 8 to 20 carbon atoms per molecule, triglycerides of fatty acids having 12 to 18 carbon atoms per molecule, and rosin acids in a concentration between about 0.3% and 1% by volume effective to give the mud a Timken load carrying capacity of at least about 30 pounds, and an emulsifier in concentrations adequate to disperse the carboxylic acid compound in the drilling mud.

12. A process for drilling a well with a rotary drill bit comprising rotating the drill bit at the bottom of the borehole of the well, pumping down the hole to the drill bit and into contact with the bearings of the drill bit a water base drilling mud consisting essentially of water, an organic carboxylic compound selected from the group consisting of monobasic fatty acids having 8 to 20 carbon atoms per molecule, triglycerides of fatty acids, having 12 to 18 carbon atoms per molecule and rosin acids, and an emulsifier to disperse the organic carboxylic compound in the water, the concentration of the organic carboxylic compound being between about 0.3% and about 7% by volume of the drilling mud effective to give the drilling mud a Timken load carrying capacity of at least about 30 pounds, and returning the drilling mud and cuttings from the formation to the well head.

13. A process as set forth in claim 12 in which the emulsifier is clay.

14. A rotary process for drilling a well comprising rotating the drill bit at the bottom of the borehole of the well, pumping down the hole to the drill bit and into contact with the bearing of the bit a water base drilling mud consisting essentially of water, clay in a concentration between about 0.25% and 20% by weight of the drilling mud, and about 0.3% to about 7% by volume of a monobasic fatty acid having 8 to 20 carbon atoms per molecule dispersed in the drilling mud to give the drilling mud a Timken load carrying capacity of at least about 30 pounds and returning the drilling mud and cuttings from the formation to the well head.

15. A process as set forth in claim 14 in which the fatty acid is tall oil.

16. In a process for drilling a well with a rotary drill bit wherein there is circulated in the well a water base drilling mud substantially free of mineral oil, a method of lubricating the drill bit and the borehole wall of the well which comprises admixing with said water base drilling mud an organic carboxylic compound selected from the group consisting of monobasic fatty acids having 8 to 20 carbon atoms per molecule, triglycerides of fatty acids having 12 to 18 carbon atoms per molecule and rosin acids in an amount sufficient to give a concentration of organic carboxylic compound between about 0.3% and about 7% by volume of the drilling mud effective to increase the Timken load carrying capacity of the water base drilling mud to at least about 30 pounds, and an emulsifier in a concentration effective to disperse the organic carboxylic compound, contacting the drill bit with the resulting drilling mud to lubricate said drill bit and contacting the wall of the well with the resulting drilling mud to lubricate said wall of the well.

17. A process as set forth in claim 16 in which the emulsifier is clay in a concentration between about 0.25% and 20% by weight of the drilling mud.

18. A process as set forth in claim 16 in which the emulsifier is a mined lignin.

19. A process as set forth in claim 16 in which the emulsifier is calcium lignosulfonate.

20. A process as set forth in claim 16 in which the emulsifier is quebracho.

21. A process as set forth in claim 16 in which the emulsifier is an alkylarylsulfonate.

22. A process as set forth in claim 16 in which the emulsifier is a non-ionic surface active agent.

23. A process as set forth in claim 16 in which the emulsifier is sodium metaborate.

24. In a method of drilling a well with a rotary drilling bit in hard formations substantially free of clays and shale in which a water base drilling mud substantially free of mineral solids and of hydrocarbon oil is circulated down the hole, the method of lubricating the rotary drill bit which comprises admixing the said water base drilling fluid, a monobasic fatty acid having 8 to 20 carbon atoms per molecule and an emulsifier in quantities to disperse the fatty acid in the water base drilling fluid, the monobasic fatty acid being present in a concentration between about 0.3% and about 7% by volume of the drilling mud effective to increase the Timken load carrying capacity of the resulting mud to at least about 30 pounds, and contacting the rotary drill bit with the resulting drilling fluid to lubricate the bit.

References Cited in the file of this patent

UNITED STATES PATENTS

| | | |
|---|---|---|
| 1,919,125 | Patch et al. | July 18, 1933 |
| 2,086,479 | Schrauth | July 6, 1937 |
| 2,209,591 | Barnes | July 30, 1940 |
| 2,271,695 | Jones | Feb. 3, 1942 |
| 2,295,067 | Williams | Sept. 8, 1942 |
| 2,468,657 | Dyke et al. | Apr. 26, 1949 |
| 2,568,992 | Doscher | Sept. 25, 1951 |
| 2,754,269 | Wasson et al. | July 10, 1956 |
| 2,773,030 | Tailleur | Dec. 4, 1956 |
| 2,773,031 | Tailleur | Dec. 4, 1956 |
| 2,788,326 | Bondi et al. | Apr. 9, 1957 |
| 2,876,197 | Watkins | Mar. 3, 1959 |

FOREIGN PATENTS

| | | |
|---|---|---|
| 320,899 | Great Britain | Oct. 21, 1929 |

OTHER REFERENCES

Davis et al., Practical Selection of Improved Lubricants, Refiner and Natural Gasoline Manufacturer, vol. 14, No. 11, Nov. 1935, pages 523 to 536.

Principles of Drilling Mud Control, tenth ed., pub. by Petroleum Extension Service, The University of Texas, Div. of Extension, pages 46 and 47.

Thomsen—Practice of Lubrication, fourth ed., pub. 1951 by McGraw-Hill Book Co., Inc., New York, N.Y., pages 14, 67 and 68.

Kalichevsky: Petroleum Refining With Chemicals, pub. 1956 by Elsevier Pub. Co., New York, N.Y., pages 561 and 562.